United States Patent [19]

Häfner

[11] Patent Number: 4,644,805

[45] Date of Patent: Feb. 24, 1987

[54] FORCE MEASURING DEVICE

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 680,126

[22] Filed: Dec. 10, 1984

[30] Foreign Application Priority Data

Dec. 12, 1983 [DE] Fed. Rep. of Germany ....... 3344901

[51] Int. Cl.⁴ ............................ G01L 1/22; G01L 5/00
[52] U.S. Cl. ...................................... 73/862.68; 338/2
[58] Field of Search ............ 73/862.68, 862.65, 862.64, 73/DIG. 4, 768, 777, 862.38; 177/211, 210 R; 338/5, 2; 310/345; 29/454

[56] References Cited

U.S. PATENT DOCUMENTS

| | | | |
|---|---|---|---|
| 3,205,464 | 9/1965 | Schwartz | 73/862.68 |
| 3,269,174 | 8/1966 | Linville | 73/862.38 |
| 3,410,135 | 11/1968 | Reynaud | 73/862.38 |
| 4,175,429 | 11/1979 | Keck | 73/862.68 |

Primary Examiner—Donald O. Woodiel
Attorney, Agent, or Firm—Armstrong, Nikaido, Marmelstein & Kubovcik

[57] ABSTRACT

The force measuring device comprises two plates arranged essentially parallel to each other and having therein between an elastomeric material into which a pressure sensor is embedded.

15 Claims, 3 Drawing Figures ered, adhered or bonded at the opposing surfaces
FORCE MEASURING DEVICE The present invention relates to a force measuring device for measuring a force exerted on two plates arranged in parallel and having arranged between them a pressure dependent means, such as a pressure transducer or sensor.

BACKGROUND OF THE INVENTION

Various force measuring devices have become known which are formed by a pressure dependent means such that as an example a liquid is included in a resilient container which liquid transfers the pressure caused by exerting a force onto the resilient container to a measuring apparatus. Considerable sealing problems are inherent to such devices.

Therefore it is an object of the present invention to provide a force measuring device of simple, compact and solid design.

Another object of the invention is to provide a force measuring device, a plurality of which can be used as a kind of measuring carpet.

These and other objects are achieved by a force measuring device where between the plates there is provided an elastomeric material into which at least one pressure transducer is embedded.

SUMMARY OF THE INVENTION

Basically the invention makes use of the fact that the physical behaviour of elastomeric materials is, in principle, similar to that of liquids which means that a pressure resulting from loading is directly converted into a measuring signal which is proportional to the load. In view of the physical state of the elastomeric materials, i.e. in view that there are no liquids, there are no sealing problems at all.

As pressure transducers piezoelectric pressure transducers or strain measuring gauges may be used. The pressure dependent means may act hydraulically, i.e. with a direct pressure transfer to an indicator.

As elastomeric materials, preferable silicones or a styrene rubber, butadiene rubber, polysulfide rubber or natural rubber or a polyarcylate or a polyurethane or a mixture of several of these materials may be used.

With a preferred embodiment of the force measuring device according to the invention, the elastomeric material is secured to the opposing surfaces of the two plates in particularly vulcanized thereto.

By means of a plurality of such force measuring devices, a force measuring carpet can be designed where the measuring signals of all force measuring devices are led together for evaluation.

Force measuring devices according to the invention or the force measuring carpet can be used for measuring the weight of very large containers or for measuring the load exerted on a vehicle wheel or axle.

BRIEF DESCRIPTION OF THE DRAWINGS

Embodiments of the force measuring device according to the invention will now be explained by reference to the drawings wherein.

DESCRIPTION OF PREFERRED EMBODIMENT

Figure 1:
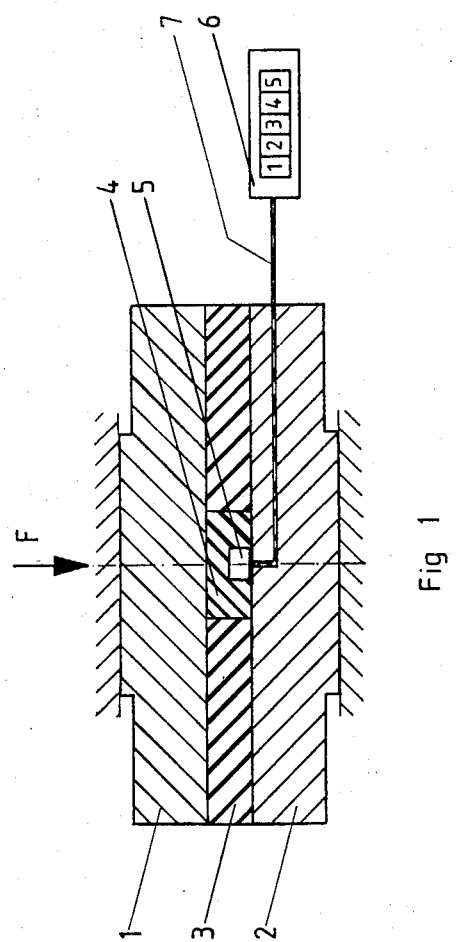
FIG. 1 shows the principle design of a force measuring device according to the invention in a vertical sectional view and FIGS. 2 and 3 shows a vertical sectional view and a plan view, respectively of a force measuring device as designed for practical use.

According to FIG. 1 an elastomeric material 3 is arranged between two plates 1, 2, which are in a parallel arrangement to each other. Basically no connection between the plates 1, 2, and the elastomeric material 3 would be necessary since there is no sealing necessary. However, it is preferred that the elastomeric material 3 is secured, adhered or bonded at the opposing surfaces of the plates 1, 2, either by an adhesive or by vulcanization.

Within the elastomeric material there is provided a pressure transducer which, as an example, may be a piezoelectric pressure transducer 5 which converts pressure into an electrical signal. The pressure transducer 5 is connected via an electrical conductor 7 to a pressure measuring and indicating apparatus 6. This apparatus may comprise a digital voltmeter which receives the force-proportional signal from the pressure transducer.

In one embodiment of the force measuring device according to the invention the piezoelectric pressure transducer 5 is embedded in a material 4 contained in a recess in the elastomeric material 3 and which has a higher viscosity than the latter material.

The material 4 may be a gel-like silicone.

If a force F is exerted onto plate 1 preferably consisting of metal, such a force is transferred to the elastomeric material 3 which conducts this force to the piezoelectric pressure transducer 5 in a pressure proportional manner.

The piezoelectric transducer 5 transmits then this force-proportional signal via conductor 7 to the measuring and indicating apparatus 6.

The piezoelectric pressure transducer may be replaced by a strain measuring gauge connected in a wheatstone bridge.

The indication at the measuring and indicating device may be in kilograms or newtons.

Alternatively, the pressure exerted to the elastomeric material 3 may be transferred to a corresponding measuring and indicating apparatus by filling the recess in the elastomeric material 3 by a liquid and having this liquid exerting the pressure via a liquid lead 7 directly to the measuring and indicating apparatus which then provides a direct hydraulic indication.

In situations where forces are exerted non-uniformly onto the upper surface of plate 1, several pressure transducers may be distributed in the elastomeric material 3. The plates 1 and 2 or at least plate 1 may have then a considerable surface, for instance in accordance with the dimensions of a truck. The pressure transducers would then be distributed in a matrix array over such a force measuring carpet. The signals derived from the pressure transducers will then be supplied to an evaluation apparatus which calculates the exerted total force and indicates the latter.

Particular fields of application of the force measuring device according to the invention are those where no extreme accuracy is necessary, such as measuring the weight of very large containers or the load exerted onto the wheel or axle of a truck or other vehicle.

Figure 2:
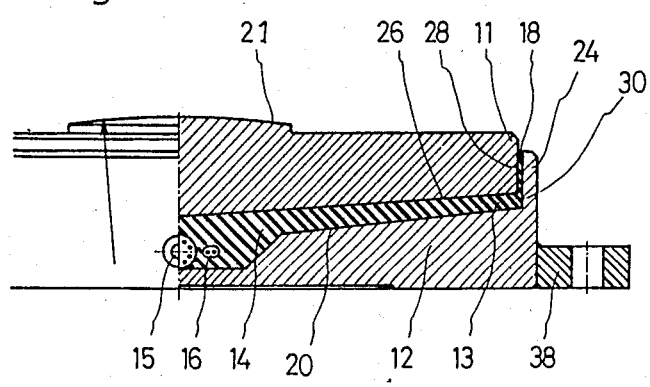
Figure 3:
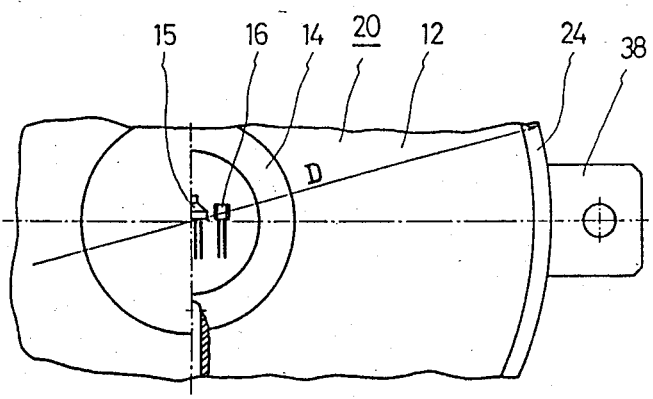

All the above has been taken into consideration with a practical embodiment of the force measuring device according to the invention according to FIGS. 2 and 3. Between an upper plate 11 and a lower plate 12 there is provided elastomeric material 13 into which a pressure transducer or sensor 15 and associated resistors 16 for temperature compensation are embedded. By means of a flange 38 the lower plate 12 may be secured to a base or support (not shown) whilst the force is exerted to the upper surface of the upper plate 11 which may be provided with a spherical region 20.

According to this embodiment the region formed between the two opposing inner surfaces of the plates 11 and 12 has a more specific form. In particular, the lower surface 26 of the upper plate 11 has a slightly convex or conical shape. The upper surface 20 of the lower plate 12 may be formed concave resulting in a flat cup-like form. A broadened central region 14 serves for the arrangement of the pressure sensor 15 and the compensation resistors 16. Furthermore, the lower plate is provided with an upwardly extending peripheral rim 24 for insertion of the upper plate 11. The dimensions are such that between the outer peripheral surface 28 of the upper plate 11 and the cylindrical inner surface 30 of the rim 24, there is only a very narrow circular gap 18 which in accordance with the dimensions of the embodiment shown in FIGS. 2 and 3 is in the order to 0.1 to 2 mm, preferable in the region between 0.2 and 0.7 mm though different gap widths are possible without affecting the principle operation of the force measuring device. The narrow gap width has the advantage that the force measuring device has a high rigidity resulting in a rapidly dampening of oscillations. Also, the temperature sensitivity is reduced.

For optimizing the operation of the force measuring device, according to the invention, the height of the gap 18 may be of importance. This gap height should not be too small since via the two opposing surfaces 28 and 30 considerable lateral forces will have to be transmitted.

By optimizing the gap 18 the influence of the temperature dependent spring characteristic of the silicone rubber may be minimized by a simultaneous reduction of measurement deflection which may be in the order to 0.01 mm. Also, a high stability against lateral forces is achieved.

By designing the upper plate 11 in the form of a swimming body the affect of self alignment upon a symmetric loading is enhanced. With a force measuring device having dimensions as shown in FIG. 2, the height of the gap 18 may be in the order of 10 to 30 mm, preferably between 15 and 20 mm.

The dimensions of the plates and the interspace between them filled with the elastomeric material are considered to be the dimensions of a preferred embodiment and these dimensions are made part of the description whilst deviations from these dimensions are in the option of a person skilled in the art.

With the embodiment according to FIGS. 2 and 3 as a pressure sensor an absolute pressure sensor is used, for instance the absolute pressure sensor KPY 14 manufactured by Siemens AG, Munich (FRG). This absolute pressure sensor 15 is embedded in the elastomeric material 13 in such a manner that there is no essential contact of the absolute pressure sensor 15 to either of the plates 11 and 12. This results in a uniform pressure distribution and a good protection of the absolute pressure sensor, the compensation resistors and the cable against environmental influences in particular against penetration of gases and humidity. Thus, such a force measuring device may be used in an underwater environment.

One or several compensation resistors 16 serve for compensation of the temperature response of the force measuring device. The resistance values of the compensation resistors 16 are computed in a well known manner dependent on the actual characteristic of the pressure sensor and under consideration of the temperature response of the elastomeric material.

As elastomeric materials 13 natural or synthetic materials may be used with a shore hardness in the range between 30 and 70 preferably 40 and 60. As an example for an elastomeric material 13 the silicone rubber RTV-ME 625 of Wacker-Chemie AG, Munich (FRG) may be used.

In order to achieve a high uniformity and incompressibility of the elastomeric material air and gas bubbles are removed from the elastomeric material before or during the hardening thereof by a novel procedure.

For manufacturing a force measuring device according to the present invention two components of a synthetic material are mixed by stirring in well known manner and a proper quantity of the mixture is poured into the lower plate 12.

In general during such a mixing and pouring it cannot be avoided that air bubbles are included into the mixture which would be detrimental for the function of the principle according to the invention i.e. the incompressibility of the material.

Preferably after inserting the upper plate 11 onto the lower plate 12 filled with the elastomeric material the unit such formed is imposed to a considerable acceleration in direction of the later force exertion. This acceleration may be in the order of 20 to 100 times of the gravity acceleration g preferably in the order between 30 and 50 g dependent on the type of elastomeric material used.

In order to achieve such an acceleration the unit formed by the plates 11, 12 and the elastomeric material 13 having embedded the pressure sensor 15 and the compensation resistors 16 is rotated preferably around a vertical axis. A simple apparatus for performing this procedure has the form of a beam scale. At the two opposite ends of the beam a tray each is flexibly connected for receiving one or more units as defined above. The rotational speed will depend on the dimensions of the scale and the desired acceleration and can be determined by a skilled person in a simple well known manner. Also, the duration of this centrifugal procedure is determined by the applied acceleration and the type of the elastomeric material 13 and may be in the range between several seconds and severeal minutes or even higher. By such a high acceleration the air bubbles are essentially completely squeezed out of the elastomeric material and may escape in a direction opposite to the acceleration force. Although such a centrifugal process may be accomplished without placing the upper plate 11 onto the lower plate 12 such a measure supports the pressure onto the elastomeric material resulting in a faster removal of air or gas bubbles which removal is further enhanced by the above mentioned convex shape of the lower surface of the upper plate 11.

As far as the hardening of the elastomeric material has not yet been completed during the centrifugal process (which in general will not be the case) the elastomeric material may complete its hardening in rest in a horizontal position of the force measuring device.

It should be mentioned that the pressure sensor 15 and the compensation resistor(s) 16 are connected to a cable (not shown) which is externally connected to the measuring and indicating device 6.

As indicated in connection with the first principle embodiment the force measuring devices of the second embodiment can be arranged in multiplicity in a kind of force measuring carpet.

Since the pressure sensor used in connection with the second embodiment has essentially similar density then the silicone rubber used the pressure sensor will essentially maintain its position spaced from the inner surfaces of the upper and lower plates. If necessary a support by means of fine wires could be used. The situation is the same for the compensation resistors, though the position of which and an eventual contact to either of the plates is not critical.

The embodiment according to FIGS. 2 and 3 is shown approximately in a scale 1:1 and such a force measuring device may be used for determining of forces in the order of 5000 to 20,000 kilograms.

Whilst with the two embodiments explained above, the elastomeric material is included between two plates essentially parallel to each other, any other members of any form could replace the two plates such that for instance the upper member is the force receiving member and the lower member is the support member or vice versa, the elastomeric material being essentially enclosed between the force receiving member and the support member.

I claim:
1. A force measuring device comprising:
   a force receiving member and a support member arranged essentially in parallel to each other and having substantially annular planar exterior surfaces perpendicular to the force to be measured and inner surfaces defining a space therebetween, said support member being formed with a peripheral rim and said force receiving member being inserted into said rim in such a manner that a narrow annular gap is formed between an outer peripheral surface of said force receiving member and an inner peripheral surface of said rim, which gap has a width in the order to between 1/100 and 1/1,000 of the diameter of said members;
   elastomeric material provided in said space between and bonded to said members and at least partially filling said gap; and
   a pressure sensor in contact with said elastomeric material.

2. A force measuring device according to claim 1 wherein said pressure sensor is a piezoelectric sensor.

3. A force measuring device according to claim 1 wherein said pressure sensor is an absolute pressure sensor embedded in said elastomeric material essentially in spaced relationship to the opposed inner surfaces of said members.

4. A force measuring device according to claim 1 wherein said members are of considerable size and have arranged therebetween in an array a plurality of pressure sensors embedded in said elastomeric material.

5. The method of manufacturing a force measuring device comprising the steps of:
   (a) Mixing components of a synthetic elastomeric material;
   (b) Initiating reaction in said mixture;
   (c) Filling a desired quantity of said mixture into a lower member having a flat tray form;
   (d) Arranging a pressure sensor within said mixture and an upper member on the upper surface of said mixture;
   (e) Exerting a multiple gravity acceleration perpendicularly to said members for a predetermined period; and
   (f) Completing reaction of the mixture until solidification of the elastomeric material.

6. The method according to claim 5 wherein the step (e) comprises rotating the unit formed by the upper and lower members and the elastomeric material therein between about an essentially vertical axis.

7. The method according to claim 5 wherein step (e) is performed for a period between several seconds and several minutes.

8. A force measuring device comprising:
   a force receiving member and a support member spaced therefrom, said force receiving member being convexly shaped in the downward direction;
   elastomeric material provided in the space between and bonded to said force receiving member and said support member; and
   a pressure sensor in contact with said elastomeric material.

9. A force measuring device comprising:
   a force receiving member and a support member spaced therefrom, said support member having a peripheral rim and said force receiving member being fitted into said rim so as to form a narrow annular gap between said members;
   elastomeric material provided in the space between and adhered to said members, said elastomeric material essentially filling said gap; and
   a pressure sensor in said space in contact with said elastomeric material.

10. A force measuring device according to any one of claims 8 and 9 wherein said elastomeric material is a silicone rubber.

11. A force measuring device according to any one of claims 8 and 9 wherein said elastomeric material is one of the materials selected from the group comprising: natural rubber, styrene rubber, butadiene rubber, polysulfide rubber, a polyacrylate, a polyurethane, a mixture of any of said materials, and a mixture of any of said materials with a silicone.

12. A force measuring device comprising:
   a force receiving member and a support member arranged essentially in parallel to each other and having substantially annular planar exterior surfaces perpendicular to the force to be measured and inner surfaces defining a space therebetween, said support member being formed with a peripheral rim and said force receiving member being inserted into said rim in such a manner that a narrow annular gap is formed between an outer peripheral surface of said force receiving member and an inner peripheral surface of said rim, which gap has a width in the order of between 1/100 and 1/1,000 of the diameter of said members and a height in the order of between 1/10 and 1/50 of said diameter;
   elastomeric material provided in said space between and bonded to said members and at least partially filling said gap; and
   a pressure sensor in contact with said elastomeric material.

13. A force measuring device comprising:
   a force receiving member and a support member arranged essentially in parallel to each other and having substantially annular planar exterior surfaces perpendicular to the force to be measured and inner surfaces defining a space therebetween, said support member being formed with a peripheral rim and said force receiving member being inserted into said rim in such a manner that a narrow annular gap is formed between an outer peripheral surface of said force receiving member and an inner peripheral surface of said rim, which gap has a width in the order to 0.1 to 2 mm;

elastomeric material provided in said space between and bonded to said members and at least partially filling said gap; and a pressure sensor in contact with said elastomeric material.

14. A force measuring device comprising:

a force receiving member and a support member arranged essentially in parallel to each other and having substantially annular planar exterior surfaces perpendicular to the force to be measured and inner surfaces defining a space therebetween, said support member being formed with a peripheral rim and said force receiving member being inserted into said rim in such a manner that a narrow annular gap is formed between an outer peripheral surface of said force receiving member and an inner peripheral surface of said rim, which gap has a width perferably in the region between 0.2 and 0.7 mm;

elastomeric material provided in said space between and bonded to said members and at least partially filling said gap; and a pressure sensor in contact with said elastomeric material.

15. A force measuring device comprising:

an annular force receiving member and an annular support member spaced therefrom, one said member having a peripheral rim and the other said member being fitted into said rim so as to form a narrow and annular gap between an outer peripheral surface of the other said member and an inner peripheral surface of said rim;

elastomeric material provided in the space between and adhered to said members, said elastomeric material essentially filling said gap; and a pressure sensor in said space in contact with said elastomeric material.

* * * * *